June 19, 1956 D. M. ADAMS 2,751,256
SIMULATED WIRE WHEEL
Filed Nov. 6, 1952 2 Sheets-Sheet 1

INVENTOR
Daniel M. Adams
BY
Willits, Helwig & Baillio
ATTORNEYS

June 19, 1956  D. M. ADAMS  2,751,256
SIMULATED WIRE WHEEL
Filed Nov. 6, 1952  2 Sheets-Sheet 2

INVENTOR
Daniel M. Adams
BY
Willits, Helmig & Baillie
ATTORNEYS

United States Patent Office 2,751,256
Patented June 19, 1956

2,751,256

SIMULATED WIRE WHEEL

Daniel M. Adams, Birmingham, Mich., assignor to General Motors Corporation, Detroit, Mich., a corporation of Delaware Application November 6, 1952, Serial No. 318,970

3 Claims. (Cl. 301—37)

This invention relates to cover structures for vehicle wheels.

An object of the invention is to provide a wheel cover structure having the appearance of a conventional wire wheel.

Another object is to provide a cover structure of the type described having improved means for attachment to a wheel.

A further object is to provide a cover structure of the type described adapted to be secured to the retaining means for the wheel and wherein the cover structure may be rotated relative to said retaining means to obtain alignment between the tire valve stem and the opening therefor in the wheel cover.

Figure 1:
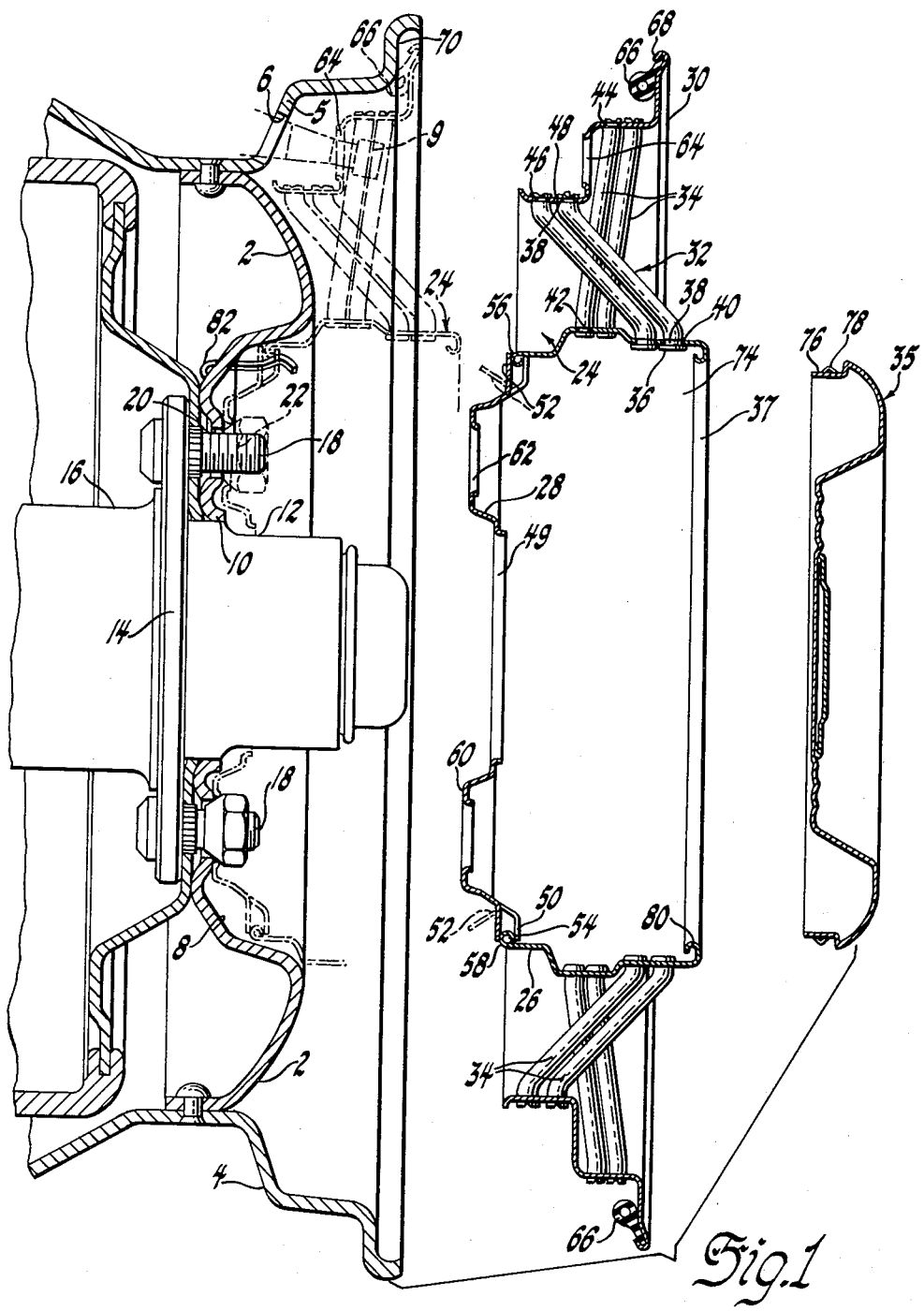
Figure 2:
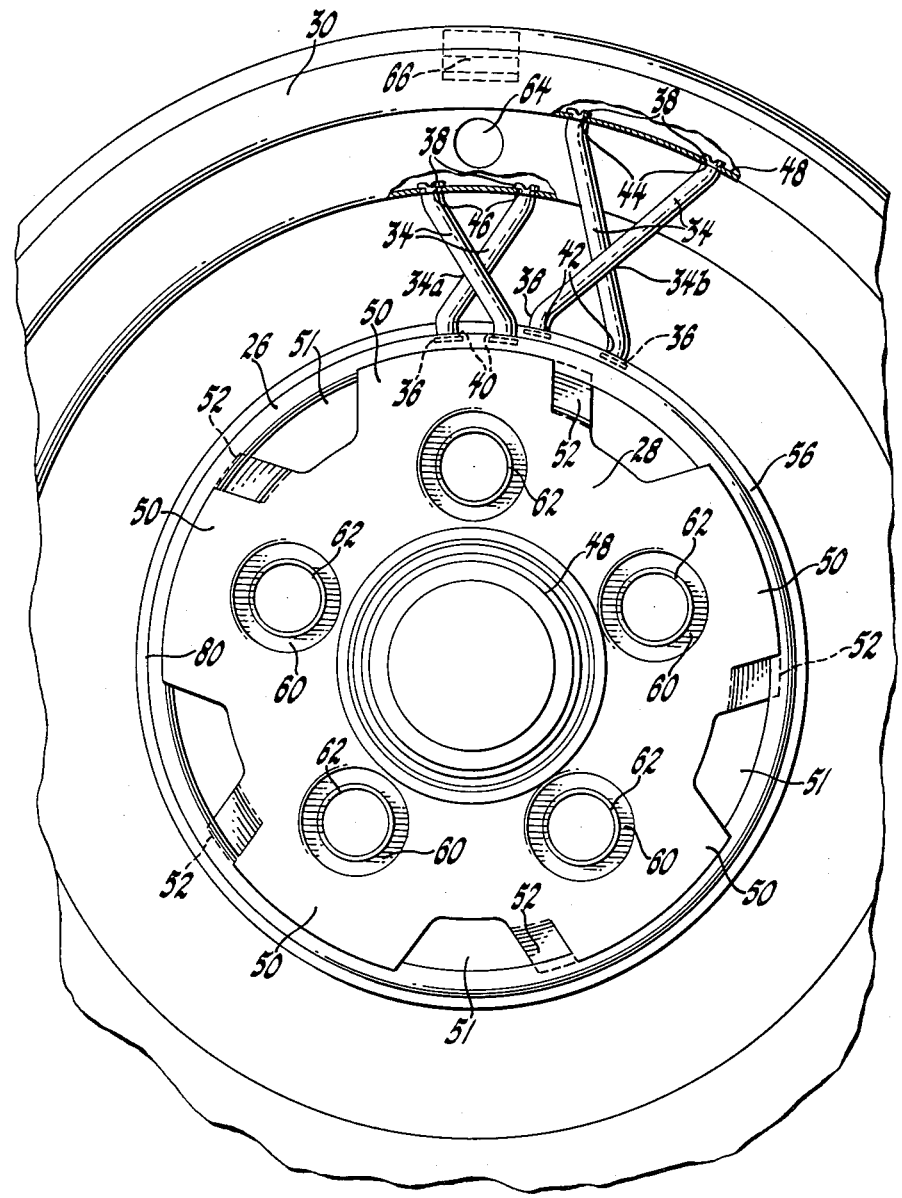

These and other objects and advantages of the invention will become more fully apparent as the description of the invention progresses in which reference is made to the accompanying drawings wherein:

Fig. 1 is an exploded sectional front elevational view of a wheel and wheel cover assembly, showing, in dotted lines, the assembled position of the cover, and Fig. 2 is a fragmentary front elevational view, partly in section, of the wheel cover, with parts broken away to show certain features of the cover structure.

Referring now to the drawings, and particularly Fig. 1, there is shown a vehicle wheel comprising an outwardly bowed body portion 2 having a conventional drop center rim 4 secured about the outer periphery thereof. Drop center rim 4 has formed in the upwardly and outwardly inclined flange 5 thereof at a suitable location circumferentially thereof an aperture 6 through which a wheel tire valve stem 9, shown in dotted lines, extends. Wheel body 2 is formed with a central dished portion 8 having a flanged central aperture 10 formed therein which is adapted to slidingly fit over a hub 12 of an axle bolt-on flange 14 formed integrally on a vehicle axle 16. A plurality of circumferentially spaced wheel bolts 18 are rigidly secured to bolt-on flange 14 and extend outwardly therefrom through a plurality of correspondingly arranged apertures 20 formed in the dished portion 8 of the wheel body 2. Upon tightening wheel nuts 22 on bolts 18, the wheel is drawn into a gripping engagement with the flange 14.

As shown best in the second stage of Fig. 1, the wheel cover assembly 24 includes a substantially cylindrical hub portion 26 having an annular retainer member 28 rotatably secured therein at the inner edge thereof in the manner and for a purpose to be described later herein. An outer rim portion 30, of inwardly stepped crossed section is spaced radially outwardly from said hub portion 26 in concentric relation therewith and is connected thereto by an intermediate annular portion 32 comprising series of circumferentially spaced spokes 34. After cover assembly 24 is secured in position in nesting relation over the wheel, as shown in dotted lines, a central cover member 35 is pressed into the circular opening 37 at the outer end or front of hub portion 26 to complete the assembly.

Spokes 34 are formed of suitable lengths of relatively heavy wire, metal tubes, or of other suitable forms and are provided with enlarged or upset flat heads 36 at the inner ends thereof and reduced portions 38 at their outer ends. Since each spoke 34 is disposed in inclined relation to the periphery of both hub 26 and rim 30, each spoke is bent a short distance from its respective ends in order to present portions disposed substantially perpendicular with the periphery of the hub 26 and rim 30, respectively, to facilitate attachment of the said spokes thereto. In order to facilitate rapid assembly and securing of the individual spokes 34 in position between the hub 26 and the rim 30, a parallel series of circumferentially spaced apertures 40 and 42 are provided about the periphery of the hub 26 and parallel series of circumferentially spaced apertures 44 and 46 are provided about the periphery of the rim 30. Apertures 40 and 42 in the hub 26 are of a size permitting the insertion of the spokes 34 while apertures 44 and 46 are sufficiently large only to permit the entrance of the reduced end portions 38 of the said spokes. It will therefore be seen that enlarged heads 36 at the inner ends of the spokes 34 engage the inner peripheral surface of hub 26 while the shoulder portion at the juncture of reduced portion 38 engages the inner peripheral surface of rim 30. After each spoke 34 has been inserted in position between the proper apertures on the hub 26 and rim 30, respectively, the reduced end portion 38 is peened over to engage the outer surface 48 of the rim 30. It will be apparent that by providing spokes of suitable length, hub 26 and rim 30 will be secured in concentric relation when the complete spoke pattern is assembled. In order to provide a spoke pattern reproducing the geometric character of a conventional load bearing wire wheel the parallel series of circumferentially spaced apertures 40 of the hub and apertures 44 of the rim are disposed in concentrically staggered relation with the circumferentially spaced apertures 42 and 46, respectively, as seen best in Fig. 2. By arranging the apertures in this manner the assembled spoke pattern comprises two circumferentially staggered series of sets of spokes 34a and 34b, each set 34a comprising circumferentially oppositely inclined spokes extending from apertures 40 near the front of hub 26 to apertures 46 near the rear of rim 30, and each set 34b comprising circumferentially oppositely inclined spokes extending from apertures 42 near the mid section of hub 26 to apertures 44 near the front edge or rim 30.

To secure the wheel cover assembly 24 in nesting relation over the vehicle wheel, as shown in dotted lines Fig. 1, the hub 26 is provided with a generally ring shaped spider or retainer member 28 having a central flanged aperture 49 provided centrally thereof. Retainer member 28 is insertable in the hub 26 from the front thereof and is retained in position by the annular beading 56 provided at the inner end of hub 26. Retainer 28 is provided with a plurality of circumferentially spaced radially extending tab portions 50 formed by notching the periphery of the ring as shown at 51, and a second series of circumferentially spaced radially extending finger portions 52 formed by slitting tab portions 50 at one side thereof. Prior to installations, finger portions 52 are bent downwardly at substantially right angles to tabs 50, for a purpose to be described later herein. When retainer member 28 is disposed within the hub 26, tab portions 50 engage the inner edge 54 of the inturned peripheral bead 56. After the retainer member 28 is placed in position, finger portions 52 are bent backwardly and engage the outer edge 58 of peripheral bead 56 to secure the retainer member 28 against axial movement relative to the hub 26.

The diameter of retainer member 28 is slightly less than that of the inner periphery of hub 26 and accordingly relative rotatable movement between the said hub and the retainer is permitted while axial movement is prevented. Retainer member 28 is also provided with an annular relatively wide offset boss portion 60 having a plurality of circumferentially spaced apertures 62 formed therein which are adapted to register with the circumferentially spaced apertures 20 of the vehicle wheel, thereby permitting the vehicle wheel and wheel cover assembly 24 to be simultaneously securable by the wheel bolts 22.

As shown particularly in Fig. 1, in dotted lines, the valve stem 9 extends through aperture 64 formed in the rim portion 30 of cover 24, in order to permit the vehicle tire to be checked at periodical intervals without the necessity of removing the cover assembly. Since the circumferential location of the valve stem aperture 6 in the rim 4 is subject to a high degree of variation with reference to the circumferential location of the wheel bolts 18, it is necessary that means be provided for assuring alignment between the valve stem aperture 6 of the wheel and the valve stem aperture 64 of the wheel cover. By providing a relatively rotatable hub portion 26 and retainer portion 28, variations in locations of the valve stem 9 from one wheel to another does not interfere with the mounting of the cover assembly. Since the hub 26 is rotatable relative to the retainer 28 it will be seen that the retainer 28 may be disposed in position over the wheel bolts 18 and the hub 26 may thereafter be rotated in the proper direction until the aperture 64 in the rim portion 30 is brought into alignment with the aperture 6 in the wheel rim 4. The wheel nuts 22 are thereafter tightly drawn up and secure the cover assembly and wheel in tight engagement with flange 14, when further relative rotation between the hub 26 and retainer 28 is prevented by the valve stem 9. To eliminate any possibility of rattling or looseness throughout the cover assembly, the rim 30 is provided with a circular rubber grommet 66 which is secured in position by crimping over the rear outer edge 68 of the said rim. As shown in dotted lines, grommet 66 is compressed against the vertical outer edge 70 of wheel rim 4 to place the entire cover assembly in tension to eliminate rattling or vibration.

After the wheel cover assembly 24 has been secured in position on the vehicle wheel, cap 35 is pressed into position to close the outer opening 37 of the hub portion 26, as previously described. Cap 35 is provided with a reduced pilot flange 76 having circumferentially spaced outwardly extending resilient fingers 78 formed thereon which are adapted to resiliently engage the rounded inturned flange 80 to securely retain the cap in position.

A large number of vehicle wheels are provided with a plurality of resilient clips 82 circumferentially spaced about the dished portion 8, which normally serve to retain a conventional hub cap in position. In order to prevent interference with these clips during assembly of cover 24 on the wheel, the notches 51 in retainer member are somewhat enlarged to provide sufficient clearance for the said spring clips which extend therethrough and into the hollow interior of hub 26.

While but a single embodiment has been shown and described, it will be apparent that other changes and modifications may be made therein without departing from the invention. It therefore is to be understood that it is not intended to limit the invention to the embodiment shown herein but only by the scope of the claims which follow.

I claim:

1. A cover structure for disposition over the outer side of a vehicle wheel, including a rim and a central load bearing portion having at a radially inner part thereof a series of circumferentially spaced apertures therein for receiving wheel attaching bolts extending from an axle member, said cover structure comprising an inner hub portion, a radially outwardly disposed rim portion, an intermediate circumferentially arranged series of spokes interconnecting said hub and said rim, and a retainer member for said cover structure connected to said hub and relatively rotatable with respect thereto, said retainer having bolt receiving apertures therein adapted for alignment with the apertures in said wheel, said bolts being accessible when said cover structure is disposed on said wheel whereby said wheel and said cover structure may be simultaneously secured to said axle member by said bolts.

2. The structure as substantially set forth in claim 1 including a cover on said hub, and interengaging means on said hub and cover for detachably retaining the latter in position.

3. A cover assembly for disposition over the outer side of a wheel structure, comprising an outer annular member, an intermediate annular section comprising angularly disposed wire spokes, an inner circular hub portion having radially inwardly extending shoulder means formed thereon, a circular retaining member, means attaching said member on said hub for relative rotary movement, said last mentioned means comprising circumferentially spaced radially extending members engaging said shoulder means at one side thereof, and a second series of circumferentially spaced radially extending offset members engaging said shoulder means at the opposite side thereof, and means securing said retaining member to said wheel.

References Cited in the file of this patent

UNITED STATES PATENTS

| 2,159,881 | Booth | May 23, 1939 |
| 2,231,183 | Flandes | Feb. 11, 1941 |
| 2,522,271 | Horn | Sept. 12, 1950 |

FOREIGN PATENTS

| 630,176 | Great Britain | Oct. 6, 1949 |
| 714,587 | France | Sept. 7, 1931 |